United States Patent
Plee

(10) Patent No.: US 6,530,974 B2
(45) Date of Patent: Mar. 11, 2003

(54) METHOD FOR THE SEPARATION OF MOLECULES IN THE GAS PHASE BY ADSORPTION BY MEANS OF AGGLOMERATED SOLID INORGANIC ADSORBENTS WITH A NARROW AND CALIBRATED MESOPORE DISTRIBUTION

(75) Inventor: Dominique Plee, Lons (FR)

(73) Assignee: CECA S.A., Puteaux (FR)

( * ) Notice: Subject to any disclaimer, the term of this patent is extended or adjusted under 35 U.S.C. 154(b) by 0 days.

(21) Appl. No.: 09/812,943

(22) Filed: Mar. 27, 2001

(65) Prior Publication Data

US 2002/0038603 A1 Apr. 4, 2002

(30) Foreign Application Priority Data

Mar. 27, 2000 (FR) .............................. 0003831

(51) Int. Cl.$^7$ .................. B01D 53/04; B01D 53/047
(52) U.S. Cl. .................. 95/99; 95/101; 95/102; 95/104; 95/106; 95/144; 95/902; 502/64
(58) Field of Search ................ 95/96–106, 114, 95/115, 143–147, 900, 902; 423/703, 705, 706, 713; 502/60, 64

(56) References Cited

U.S. PATENT DOCUMENTS

| | | | |
|---|---|---|---|
| 5,057,296 A | 10/1991 | Beck | 423/277 |
| 5,098,684 A | 3/1992 | Kresge et al. | 423/277 |
| 5,102,643 A | 4/1992 | Kresge et al. | 423/328 |
| 5,104,515 A | 4/1992 | Chu et al. | 208/46 |
| 5,108,725 A | 4/1992 | Beck et al. | 423/263 |
| 5,110,572 A | 5/1992 | Calabro et al. | 423/328 |
| 5,112,589 A | 5/1992 | Johnson et al. | 423/328 |
| 5,145,816 A | 9/1992 | Beck et al. | 502/60 |
| 5,156,829 A | 10/1992 | McCullen et al. | 423/718 |
| 5,174,888 A | 12/1992 | Kresge et al. | 208/46 |
| 5,183,561 A | 2/1993 | Kresge et al. | 208/251 R |
| 5,196,633 A | 3/1993 | Kresge et al. | 585/469 |
| 5,198,203 A | 3/1993 | Kresge et al. | 423/718 |
| 5,200,058 A | 4/1993 | Beck et al. | 208/46 |
| 5,204,310 A * | 4/1993 | Tolles et al. | 95/901 X |
| 5,206,207 A * | 4/1993 | Tolles | 95/901 X |
| 5,211,934 A | 5/1993 | Kresge et al. | 423/706 |
| 5,215,737 A | 6/1993 | Chu et al. | 423/706 |
| 5,220,101 A | 6/1993 | Beck et al. | 585/824 |
| 5,238,676 A | 8/1993 | Roth et al. | 423/713 |
| 5,246,689 A | 9/1993 | Beck et al. | 423/705 |
| 5,250,282 A | 10/1993 | Kresge et al. | 423/705 |
| 5,258,114 A | 11/1993 | Aufdembrink et al. | 208/113 |
| 5,264,203 A | 11/1993 | Beck et al. | 423/703 |
| 5,300,277 A | 4/1994 | Kresge et al. | 423/703 |
| 5,304,363 A | 4/1994 | Beck et al. | 423/328.1 |
| 5,334,368 A | 8/1994 | Beck et al. | 423/704 |
| 5,370,785 A | 12/1994 | Beck et al. | 208/46 |
| 5,378,440 A | 1/1995 | Herbst et al. | 423/210 |
| 5,393,329 A * | 2/1995 | Inagaki et al. | 95/146 X |
| 5,583,277 A | 12/1996 | Kuehl | 585/820 |
| 5,587,084 A * | 12/1996 | Boyd et al. | 95/144 X |
| 5,667,560 A * | 9/1997 | Dunne | 95/144 X |
| 5,702,505 A * | 12/1997 | Izumi et al. | 95/144 X |
| 5,837,639 A | 11/1998 | Kresge et al. | 502/64 |
| 5,849,980 A * | 12/1998 | Lai | 95/147 X |
| 5,895,769 A * | 4/1999 | Lai | 95/147 X |
| 6,017,508 A * | 1/2000 | Millar et al. | 95/902 X |
| 6,093,236 A * | 7/2000 | Klabunde et al. | 95/143 X |

FOREIGN PATENT DOCUMENTS

EP  744 210  11/1996

OTHER PUBLICATIONS

Namba: "Pressure swing adsorption of organic solvent vapors on mesoporous silica molecular sieves" *Studies in Surface Science and Catalysis*, vol. 105, 1997, pp. 1891–1898.

* cited by examiner

*Primary Examiner*—Robert H. Spitzer
(74) *Attorney, Agent, or Firm*—Millen, White, Zelano & Branigan, P.C.

(57) ABSTRACT

The present invention relates to a novel family of inorganic solids with a narrow and calibrated mesopore distribution which are agglomerated with a binder; these solids can advantageously be used as adsorbents for the industrial separation of gas-phase compounds having different boiling points.

15 Claims, 1 Drawing Sheet

METHOD FOR THE SEPARATION OF MOLECULES IN THE GAS PHASE BY ADSORPTION BY MEANS OF AGGLOMERATED SOLID INORGANIC ADSORBENTS WITH A NARROW AND CALIBRATED MESOPORE DISTRIBUTION

FIELD OF THE INVENTION

This invention relates to a novel family of adsorbents based on an inorganic solid with a narrow and calibrated mesopore distribution which are agglomerated with a binder; these adsorbents are intended for the separation in the gas phase of compounds having different boiling points.

PRIOR ART

The adsorption technology is increasingly used industrially, for example for removing organic compounds present at a low content in a gas or liquid stream; it has the advantage of often being less expensive than other known industrial solutions, in particular when high volumes comprising impurities or trace amounts at a low concentration have to be treated and/or purified. Generally, a system operates with at least two columns filled with adsorbent, each column operating alternately in adsorption and desorption, the latter being intended to regenerate the adsorbent. The growth in this technology is driven to expand given the increase in regulations relating to the emission of VOCs (Volatile Organic Compounds), molecules which are encountered in all branches of the chemical industry and which can be chlorinated molecules or oxygenated molecules, such as ketones, or can belong to the aromatic family. The USEPA (United States Environmental Protection Agency) defines VOCs as stable compounds having a vapour pressure of greater than 0.1 mmHg (13.33 Pa) under standard temperature and pressure conditions.

The commonest technology for adsorbing VOCs in the gas phase consists in using a column filled with active charcoal over which the fluid to be treated is passed. When the concentration of the pollutant at the column outlet reaches a predetermined value, regeneration is carried out either with steam at a temperature close to 150–200° C. or with a partial vacuum (technology of VRU (Volatile Recovery Unit) type). In the case of water-immiscible solvents, the method of regeneration of the active charcoal with steam is particularly advantageous as it makes it possible to recover the organic entity or entities, by separation by settling. However, it is known that the use of active charcoals has a number of disadvantages, such as the partial blocking of the pores by polymerization of reactive VOCs, a polymerization which is catalyzed by the surface ash of the charcoal; the active charcoal can also exhibit risks of ignition in the presence of oxygenated molecules when high heats of adsorption are involved. Finally, as the regeneration of the active charcoal is rarely complete, its capacity therefore decreases with the passage of the cycles, which forces the industrial operator to replace the active charcoal when its adsorption capacity has become too low. These disadvantages have prompted industrial users to find replacement solutions: the hydrophobic zeolites developed on this occasion, for example zeolites ZSM-5, have made it possible to avoid some of the disadvantages related to the use of active charcoal, in particular the risks related to inflammability (Blocki, S. W., Environ. Prog., 1993, 12, p. 226–230). However, their much higher price and their lower adsorption capacity than those of active charcoal are a brake on their industrial development and there thus exists a need for industrial adsorbents of moderate cost and with an adsorption capacity comparable to that of active charcoal while not exhibiting its handling hazards and having a superior regeneration capacity.

A family of mesoporous inorganic compounds with a narrow and calibrated distribution of the mesopores comprising in particular a mesoporous silica, the synthesis of which was disclosed for the first time in 1969 by Sylvania Electric Products Inc. in U.S. Pat. No. 3,556,725, the (alumino)silicon compounds of which family and more particularly the compound MCM 41 (for Mobil Composition Of Matter 41), a process for the synthesis of which is found in Nature, 1992, vol. 359, pp. 710–712, were much studied by Mobil at the beginning of the 1990s and have formed the subject of numerous patents and scientific articles, is now well known on the laboratory scale with regard to the porous structure, the synthetic conditions and the possible applications as catalyst and/or as adsorbent. In "VOC Removal: Comparison of MCM 41 with Hydrophobic Zeolites and Activated Carbon" by X. S. Zhao, Energy and Fuels, 1998, a comparative study is given regarding the respective adsorption and desorption properties of active charcoals, hydrophobic zeolites and MCM 41 as a powder for the removal of VOCs. From the plot alone of the isotherms of benzene, hexane and carbon tetrachloride, the authors conclude that the MCM 41 solids, because of their high mesoporous volume, which is markedly greater than that of hydrophobic zeolites, might constitute advantageous adsorbents for the removal of VOCs present at a high concentration in very wet gas flows but are only capable of adsorbing VOCs at a low concentration by a post-treatment intended to modify the diameter of the opening of their pores. Furthermore, the authors show that the desorption can optionally be carried out at a lower temperature than for the other adsorbents (of the order of 60° C. instead of 100° C.).

The adsorption of small organic molecules (methanol, butanol, toluene) on MCM 41 which has a variable level of aluminium and which is agglomerated by sintering was studied by T. Boger et al. ("Influence of the aluminium content on the adsorptive properties of MCM 41", Mesoporous Materials, 8, 1997, p. 79–91); the authors show that the adsorption of the organic molecules is subject to virtually no influence by the aluminium content of the MCM 41, which leads them to expect a capillary condensation mechanism, but also that the adsorption of the organic molecules is more unfavourably influenced in proportion as the sintering pressures increase. The adsorption of water is low and has a tendency to increase when the Si/Al ratio decreases; it remains in all cases low and partially irreversible. The adsorbent can be regarded as having a hydrophobic surface. The authors conclude therefrom that these adsorbents might be used in a humid atmosphere for removing VOCs present in gas streams at moderate to high concentrations but will have to be used in combination with a hydrophobic zeolite in order to obtain a high degree of purification, the hydrophobic zeolite adsorbing, for its part, the VOCs present at a low concentration. The partial irreversibility of the adsorption of water is confirmed by other authors ("Adsorption Studies on Ordered Mesoporous Materials" by J. Janchen, Prog. In Zeolite and Microporous Materials, Studies in Surface Science and Catalysis, vol. 105, 1997, p. 1731).

Cycles of adsorption and of desorption of toluene and of 2-propanol were carried out on MCM 41 powder and compared with those obtained on a hydrophobic zeolite of ZSM 5 type ("Pressure Swing Adsorption of Organic Solvent Vapors on Mesoporous Silica Molecular Sieves" by S. Namba et al., Prog. In Zeolite and Microporous Materials, Studies in Surface Science and Catalysis, vol. 105, 1997, p. 1891). The authors record a better working capacity of the mesoporous solid and a lower catalytic activity than that of the hydrophobic zeolite in the dehydration of propanol and conclude that a process of PSA type might make it possible to recover toluene or propanol vapours although they carried out their experiments at isopressure in desorbing under nitrogen.

All the conclusions of these abovementioned articles and patents are based on laboratory tests on powder products such as result from the hydrothermal synthesis and the use of these products in industrial plants cannot be envisaged, given the disadvantages relating to the handling and to the use of pulverulent materials.

DESCRIPTION OF THE INVENTION

Figure 1:
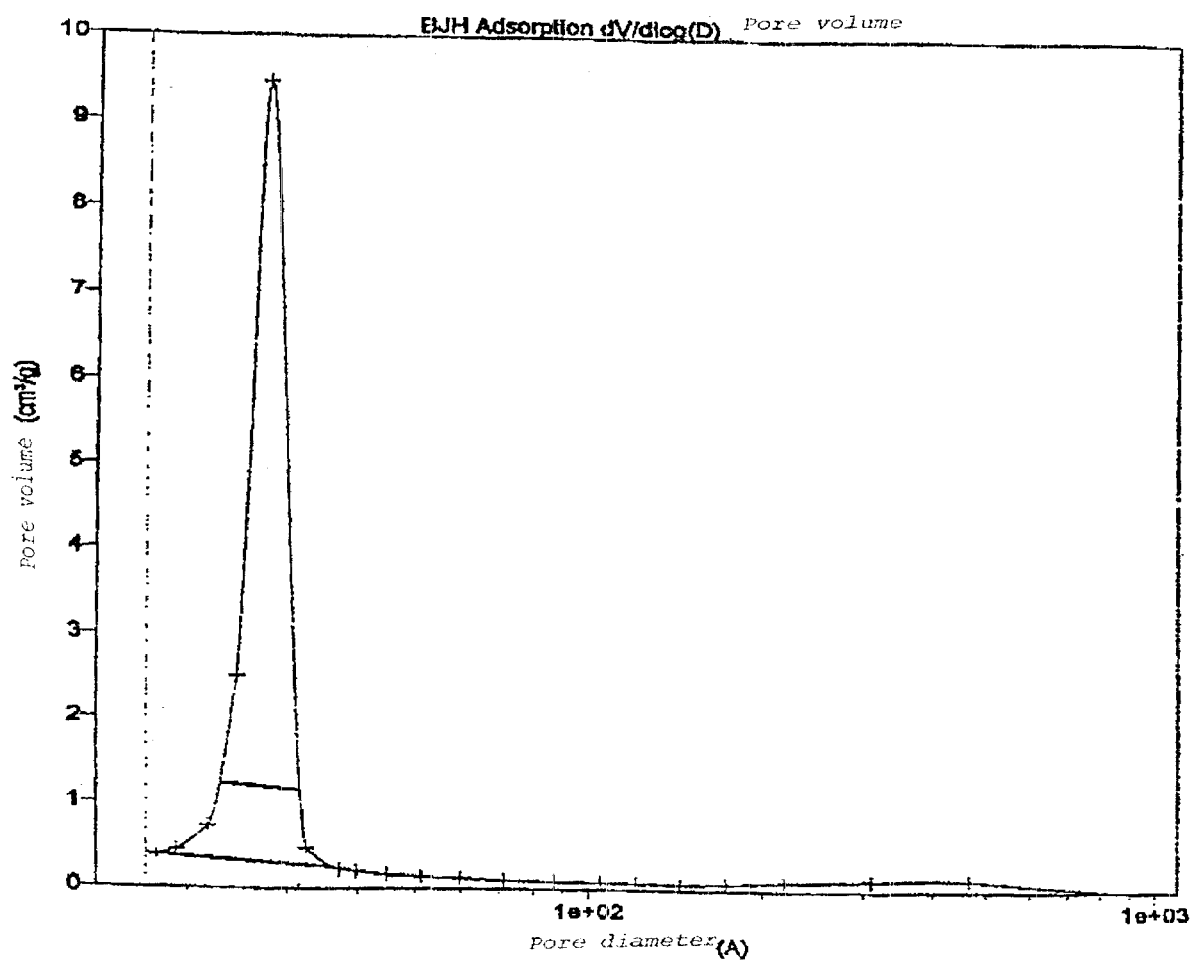
FIG. 1 is a pore distribution curve showing the size of the pores in relationship to the pore volume.

The present invention provides a novel family of industrial adsorbents which can be used in gas-phase adsorption processes which operate cyclically and more particularly for the adsorption of VOC organic molecules present in gas streams, even at a low concentration.

In comparison with the other industrial adsorbents known for the adsorption of VOCs in the gas phase, namely active charcoal and hydrophobic zeolite, this novel family of adsorbents exhibits numerous advantages and in particular:

high desorption capacity for the adsorbed VOCs
easy regeneration of the adsorbent
separation of the adsorbed VOCs as a function of their boiling points
absence of inflammability of the adsorbent
easy handling of the adsorbent.

In addition, this novel family of adsorbents makes it possible to very efficiently separate compounds having different boiling points.

The adsorbents of the present invention are porous inorganic solids with a narrow and calibrated mesopore distribution and with a mean particle size generally between 1 and 10 mm. The term "porous solids with a narrow and calibrated mesopore distribution" according to the invention is understood to mean solids which are capable of adsorbing more than 7.5% and preferably more than 10% by weight of toluene under a relative pressure of 0.5 at 25° C., which exhibit a mesopore volume of greater than or equal to 0.09 cm³/g, at least 90% of the total pore volume of which has a diameter of greater than 20 Å and at least 90% of the porosity of which is distributed about the mean diameter plus or minus 5 Å, and which comprise:

from 50 to 95 parts by weight (calculated as calcined equivalent) of a porous inorganic solid, known as MTS (for Micelle Templated Silica), which is capable of adsorbing more than 15% by weight of toluene under a relative pressure of 0.5 at 25° C. and which exhibits a mesopore volume of greater than or equal to 0.18 cm³/g with a narrow and calibrated mesopore distribution, that is to say at least 90% of the total pore volume of which has a diameter of greater than 20 Å and at least 90% of the porosity of which is distributed about the mean diameter plus or minus 5 Å, from 50 to 5 parts by weight of an inert binder (inert in the sense of the adsorption).

The term "mean diameter" is understood to mean the value of the pore diameter corresponding to the maximum of the peak of the particle size distribution of the MTS.

The pore volumes shown above are measured by the DFT method (cylindrical pores).

The preferred inorganic solids with a narrow and calibrated mesopore distribution according to the invention have a chemical composition which can be represented empirically by the formula:

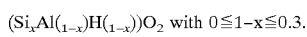

$(Si_xAl_{(1-x)}H_{(1-x)})O_2$ with $0 \leq 1-x \leq 0.3$.

These solids can, for example, be prepared by crystallization of a reaction mixture comprising a source of silica, an agent for mobilizing the silica, such as sodium hydroxide, optionally a small amount of aluminium, a surfactant which acts as directing agent and a solvent, optionally in the presence of a swelling agent which dissolves in the micelles, preferably trimethylbenzene.

Mention will very particularly be made, as examples of directing agents, of surfactants comprising quaternary ammonium or phosphonium ions which are substituted by identical or different aryl or alkyl groups having from 6 to 36 carbon atoms and which are associated with hydroxide, halide or silicate anions, in particular those which comprise cetyltrimethylammonium, cetyltrimethylphosphonium, octadecyltrimethylammonium, octadecyltrimethylphosphonium, benzyltrimethylammonium, cetylpyridinium, decyltrimethylammonium, dimethyldidodecylammonium or trimethyldodecylammonium ions, and amines, such as dodecylamine and hexadecylamine.

The solvent can be organic but is preferably aqueous.

The pH of the reaction mixture is not generally critical and can vary between 1 and 14. The crystallization of the solid can be carried out with stirring or without stirring. The crystallization temperature is generally between ambient temperature and 200° C. and the duration of the crystallization reaction can generally range from a few minutes to a few days. An interpretation commonly accepted by numerous authors is that, in basic medium, the silica becomes arranged around the micelles of the surfactant by interaction between the cationic head of the surfactant and the ionized silanol groups which are found at the surface of the silica. Depending upon the operating conditions used, it is possible to vary the distances between the pores or thicknesses of pores. For example, the pH makes it possible to vary the thickness of the walls.

On conclusion of the crystallization stage proper, the gel is obtained in solution or in suspension in the solvent, which gel is filtered off, washed and dried; the product obtained is provided, after calcination intended to remove the surfactant by combustion, in the form of a pulverulent inorganic solid having pores of uniform size which can have cubic or hexagonal symmetry, according to the synthesis conditions. In the case of hexagonal symmetry, the pores are all parallel.

To prepare the industrial adsorbents according to the invention, the MTS has to be agglomerated with a binder (inert in the sense of the adsorption), for example chosen from clays, such as montmorillonite, attapulgite, kaolinite or sepiolite, silicas, or titanium or zirconium oxides, in the presence of water according to well-known techniques (extrusion, granulation).

In the case of agglomeration by extrusion, it is preferable also to add an extrusion additive, preferably carboxymethylcellulose. The amounts of water (and of extrusion additive) are adjusted so that the extrusion pressure measured at the paste/piston or screw contact is greater than or equal to 5 MPa. The particle size of the adsorbents thus agglomerated is typically between 1 and 10 mm.

After this shaping, the product is subjected to calcination at a temperature of at least 400° C. and an adsorbent according to the invention as defined above is obtained.

Another subject-matter of the present invention is an industrial process for separating the components of a mixture composed of at least two different gas compounds which operates cyclically and which employs the agglomerated MTSs defined above. The process comprises the following alternately operating stages, which are explained in detail below:

a) passing the gas mixture into an adsorption region comprising the agglomerated MTS and recovering, at the outlet of the adsorption region, either the compound or compounds having the lowest boiling point or a gas mixture enriched in compound(s) having the lowest boiling point, b) desorbing the compound or compounds adsorbed in the adsorption region, c) regenerating the adsorption region so as to restore its adsorption capacity to it.

The regeneration stage c) is carried out by vacuum means (suction), by purging the adsorption region with one or more inert gas(es) and/or with the gas stream obtained at the outlet of the adsorption region, by increase in temperature or by a combination of the regenerations by suction, by purging and/or by variation in temperature.

The preferred processes are of the PSA or VSA type, of TSA type or a combination of these various types of processes (PTSA).

Among the processes of PSA or VSA type, these whose desorption stage b) is carried out by lowering the partial pressure of compounds adsorbed within the adsorption region, followed by a rise in pressure in the adsorption region by introduction of a stream of the compound with a low boiling point or of the gas mixture enriched in compound with a low boiling point, countercurrentwise or cocurrentwise (stage c)) are preferred.

Among the processes of TSA type, these whose desorption stage b) is carried out by increasing the temperature of the adsorption region with respect to the temperature of stage a) are preferred.

Among the processes of PTSA type, these whose desorption stage b) is carried out by increasing the temperature of the adsorption region with respect to the temperature of stage a) and by lowering the partial pressure of compounds adsorbed within the adsorption region, followed by a rise in pressure in the adsorption region by introduction of a stream of the compound with a low boiling point or of the gas mixture enriched in compound with a low boiling point, countercurrentwise or cocurrentwise (stage c)) are preferred.

This process is particularly well suited to the separation of VOCs present even at a very low concentration in gas streams, preferably based on dry or humid air.

The process of the present invention is also well suited to the purification of hydrocarbons, particularly of oxygenated hydrocarbons and more specifically still of hydrocarbons belonging to the group of the ketones, aldehydes, acids or alcohols, as a mixture of compounds, preferably in the form of impurities or of trace amounts.

The application of MTS powder in the removal of polyaromatic molecules from a gas phase, such as a reforming gas, is disclosed in U.S. Pat. No. 5,583,277; the adsorption is carried out at a relatively high temperature, in a thermal region where the smaller molecules are not adsorbed, the principle thus being to separate large molecules from other smaller molecules.

EXAMPLE 1

Preparation of a Mesoporous Inorganic Solid With a Narrow and Calibrated Distribution of the Mesopores An aqueous surfactant solution is prepared by dissolving 29.4 g of Noramium MS 50 (aqueous trimethylcetylammonium (abbreviated to C16+) chloride solution comprising 50% of active material, sold by Ceca) in 140 g of water and then a second aqueous solution is prepared by mixing 5.2 g of sodium hydroxide pellets and 65 g of water, adding, with stirring, 122 g of sodium silicate. The surfactant solution is brought to 60° C. and placed under stirring and then the silicate solution is added thereto over 20 minutes while maintaining the temperature of the mixture at 60° C.; partial neutralization using an aqueous sulphuric acid solution (composed of 16 g of $H_2SO_4$ and of 40 g of water) is subsequently carried out with vigorous stirring and the mixture is brought to 100° C. with gentle stirring for 16 hours.

A gel is obtained, the calculated composition of which is as follows:

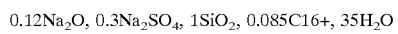

$0.12Na_2O, 0.3Na_2SO_4, 1SiO_2, 0.085C16+, 35H_2O$

The gel is subsequently filtered off, then washed with 6 liters of water and finally dried at 80° C. overnight. 44 g of pulverulent solid with a loss on ignition of 48% and a mean diameter, measured by DFT of 35 Å are thus recovered. This solid is referred to in what follows as MTS 35.

EXAMPLE 2

Preparation of a Mesoporous Inorganic Solid With a Narrow and Calibrated Distribution of the Mesopores An aqueous surfactant solution is prepared by dissolving 33.6 g of Noramium MC 50 (aqueous trimethyldodecylammonium (abbreviated to C12+) chloride solution comprising 50% of active material, sold by Ceca) in 96 g of water and then a 2$^{nd}$ aqueous solution is prepared by adding 24.5 g of sodium hydroxide pellets to 88 g of water and by adding to this solution, with stirring, 150 g of sodium silicate (25.5% $SiO_2$, 7.75% $Na_2O$). The surfactant solution is brought to 60° C. and then the silicate solution is added with stirring over 50 minutes. Partial neutralization using a sulphuric acid solution (35.9 g of $H_2SO_4$ and 170 g of water) is subsequently carried out with vigorous stirring and the mixture is brought to 50° C. with gentle stirring for 20 hours.

The composition of the gel is:

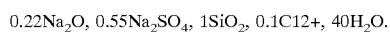

$0.22Na_2O, 0.55Na_2SO_4, 1SiO_2, 0.1C12+, 40H_2O.$

The gel is filtered off, washed with 7 liters of water and dried at 80° C. overnight. 46.5 g of solid with a loss on ignition of 47.4% and a mean diameter, measured by DFT, of 25 Å are thus recovered; this solid is referred to as MTS 25.

EXAMPLE 3

Preparation of 2 Adsorbents According to the Invention

The powders obtained in Examples 1 and 2 are shaped by agglomeration by mixing the powders with a clayey binder and a water-retaining agent, such as carboxymethylcellulose, intended to facilitate the shaping, followed by the extrusion of the mixture. The content of binder, expressed as the ratio of weight of binder to total weight (binder+MTS), is 20%.

The extrudates thus obtained are subsequently crushed, so that their mean length is equal to approximately 4 to 5 mm, and then they are dried and calcined at 550° C. for 2 hours under air. The main characteristics of the adsorbents according to the invention thus obtained are shown below:

| Type of MTS | MTS 25 | MTS 35 |
|---|---|---|
| Pore volume by toluene adsorption (25° C.- P/Ps = 0.5) (cm³/g) | 0.49 | 0.48 |
| BET surface (m²/g) | 891 | 700 |
| Pore volume by N₂ adsorption at 77° K (<100 Å (cm³/g) | 0.66 | 0.62 |
| Mean diameter by N₂ adsorption at 77° K (DFT) (Å) | 25 | 35 |

By application of the DFT method and of the Broekhof-de Boer cylindrical pore model, which allows access to the pore distribution, it is also found that most of the pore volume is predominantly distributed about the mean diameter plus or minus 5 Å.

EXAMPLE 4

Toluene Adsorption Capacity of Several Adsorbents

An adsorption assembly is prepared which makes it possible to evaluate the behaviour of the materials prepared in Example 3. This assembly comprises:

two evaporators swept with a nitrogen stream and comprising either a solvent or water an adsorption column with a diameter of 1.4 cm and a height of 50 cm a gas chromatograph for analyzing the composition at the column outlet.

The nitrogen flow, comprising solvent (and optionally water by passing through the evaporators), passes through the column from the bottom upwards. In the cases where it is desired to study the molecular separation, the two evaporators are fed with solvent.

At the column top, the concentration of entity A is measured as a function of the time and the breakthrough curve can thus be monitored: when the concentration of entity A at the column outlet becomes similar to the concentration of entity A at the inlet of the column, the adsorbent is saturated. The results can be expressed by the adsorption capacity at breakthrough, here taken at 1% of the inlet concentration and its saturation.

A—The first experiment relates to the adsorption of toluene at two partial pressures, in comparison with an active charcoal of AC 40 type prepared by physical activation (BET specific surface area 1.105 m²/g; pore volume by N₂ adsorption 0.54 cm³/g; pore volume by toluene adsorption 0.50 cm³/g; mean diameter, measured by DFT, 18–20 Å).

The total gas flow rate chosen is 26 Sl/h and the adsorption temperature is 22° C.

| Type of adsorbent tested | Agglomerated MTS 25 | Agglomerated MTS 35 | AC 40 |
|---|---|---|---|
| Adsorption capacity at breakthrough (%) P/Ps = 0.32 | 31 | 26.3 | 33.6 |
| Adsorption capacity at breakthrough (%) P/Ps = 0.5 | 36 | 35.2 | 34.3 |

The active charcoal tested and the adsorbents according to the invention are comparable with regard to adsorption behaviour; it is also found that the adsorption capacity of the adsorbents according to the invention is not affected by the presence of the inert binder and is comparable with the adsorption capacity of nonagglomerated mesoporous solid presented in the literature.

B—The subject of interest now is the adsorption behaviour of the adsorbents tested above for gas phases comprising water at the partial pressure of 0.4, the remainder being unchanged.

| Type of adsorbent tested | Agglomerated MTS 25 | Agglomerated MTS 35 | AC 40 |
|---|---|---|---|
| Adsorption capacity at breakthrough (%) P/Ps = 0.32 | 30 | 26 | 33.1 |

The presence of water does not significantly interfere with the adsorption of the toluene on any of the three adsorbents tested.

It is thus confirmed that the solids of MTS type may be good candidates for removing aromatic VOCs as they exhibit a high pore volume, markedly higher than that of hydrophobic zeolites with a Y or ZSM 5 structure, while being, like them, silicic in nature.

EXAMPLE 5

Desorption/Regeneration Capacity of Various Adsorbents

This example relates to the regeneration of the adsorbents tested above: when saturation of the latter is obtained, desorption with nitrogen is carried out under a stream of 26 Sl/h for 16 hours.

The three adsorbents are then weighed and the non-desorbed toluene residual on each of them is deduced therefrom; this value gives an indication of their regeneration capacity.

| Type of adsorbent tested | Agglomerated MTS 25 | Agglomerated MTS 35 | AC 40 |
|---|---|---|---|
| Residual (%) P/Ps = 0.32 | 1 | 1.4 | 25 |
| Residual (%) P/Ps = 0.5 | 1.6 | 1.7 | 23.2 |
| Residual (%) P/Ps = 0.32 + water | 1 | 2.4 | 22.62 |

It is clearly apparent that the adsorbents according to the invention are regenerated much better than the active charcoal, which is believed to be due to a virtually complete absence of microporosity in the MTSs; under the conditions used, the carbon tested only desorbs approximately 30% of the amount of toluene adsorbed, the consequence of which will be that, during subsequent adsorption/desorption cycles, its effectiveness in terms of useful working capacity will be very greatly reduced, unlike the adsorbents according to the invention.

EXAMPLE 6

Adsorption/Desorption of an Oxygenated Compound

The adsorption of methyl ethyl ketone (MEK), an oxygenated compound, is compared here on the adsorbent according to the invention MTS 25 and on active charcoal AC 40.

The adsorption assembly described in Example 4 is used and the following is passed through the column:

either a gas flow composed of dry nitrogen and of MEK (MEK partial pressure: 0.42),
or a gas flow composed of nitrogen, of MEK and of water (MEK partial pressure: 0.42; water partial pressure: 0.4), which represents, in both cases, an entrained amount of MEK of the order of 3.8 g/h. A first cycle is carried out comprising adsorption to saturation, followed by desorption under nitrogen (Q=26 Sl/h), and then a second cycle is carried out comprising only adsorption to saturation.

The adsorption capacities at breakthrough obtained on conclusion of the adsorption of the $1^{st}$ and $2^{nd}$ cycles are combined in the table below:

| Type of adsorbent tested | Agglomerated MTS 25 | AC 40 |
|---|---|---|
| Adsorption capacity at breakthrough (MEK alone), $1^{st}$ cycle (%) | 30.3 | 30.3 |
| Adsorption capacity at breakthrough (MEK alone), $2^{nd}$ cycle (%) | 23 | 7.7 |
| Adsorption capacity at breakthrough (MEK + water), $1^{st}$ cycle (%) | 36 | |
| Adsorption capacity at breakthrough (MEK + water), $2^{nd}$ cycle (%) | 21 | |

For the initial adsorption, the behaviour of the adsorbents is observed to be very similar but the MTS is observed to have a regeneration capacity which is superior to that of the active charcoal. On repeating the experiment over 40 adsorption/desorption cycles, the adsorption capacity at breakthrough of the two adsorbents is measured at the end of these 40 cycles: 20.1% for the MTS 25 and only 7.5% for the active charcoal; it is therefore concluded that the adsorbent according to the invention has a much better useful working capacity than that of the active charcoal.

EXAMPLE 7

Separation of Two Compounds With Different Boiling Points

The adsorption of two compounds having different boiling points is compared here with the adsorbent according to the invention MTS 25 and with the active charcoal AC 40.

The adsorption assembly described in Example 4 is used and a gas stream composed of nitrogen, of toluene (1.22 g/h) and of ethylbenzene (0.456 g/h), the boiling points of which are 110° C. and 136° C. respectively, is passed through the column with a total flow rate equal to 17 Sl/h, followed by desorption at the same flow rate under pure nitrogen, which is continued until P/Ps=0.025; the concentration of the compounds at the column outlet is monitored by gas chromatography (GC) and it is found that the toluene breaks through first, followed by the ethylbenzene, with a toluene relative concentration C/Co of greater than 1, which means there is effectively a displacement of one molecule by the other. The experiment is carried out on MTS 25 and on the charcoal AC 40.

The adsorption capacity at breakthrough for toluene, the less adsorbed compound, and the amount of toluene produced by the system per 100 grams of adsorbent and for an ethylbenzene (EtBz) content either of less than 0.1% or of less than 0.5% are expressed.

| Type of adsorbent tested | Agglomerated MTS 25 | AC 40 |
|---|---|---|
| Adsorption capacity at breakthrough for toluene (%) | 30.3 | 25.3 |
| Amount of toluene produced (<0.1% of EtBz) (g) | 26 | 9.2 |
| Amount of toluene produced (<0.5% of EtBz) (g) | 27.2 | 18.4 |

It is clearly apparent that the adsorbents according to the invention are capable of separating molecules with different boiling points more efficiently than an active charcoal.

EXAMPLE 8

In this example, a test of VSA (Vacuum Swing Adsorption) type is carried out under the following conditions:

1 adsorption column with a diameter of 5 cm and a height of 1.5 m filled with 1.022 g of MTS 35 resulting from Example 1 in the form of extrudates with a diameter of 1.6 mm purification of air comprising 28 g/m³ of a mixture of 50% by weight ethyl acetate, 42% ethanol and 8% isopropanol.

Adsorption Conditions

Atmospheric pressure

Duration of passage of the gas stream: 30 minutes from the bottom upwards

Velocity in the empty shaft: 14 cm/s

Flow rate of the gas stream: 1 m³/h

Desorption Conditions

Pressure: 5.9 kPa

Duration: 30 minutes from the top downwards

Purge flow rate=60 l/h

Each cycle thus lasts one hour; the concentration at the outlet is measured while making sure that the front is fully stabilized in the column, which corresponds to stationary operation during the cycles. The concentration (stable over time) measured at the outlet is less than 0.15 g/m³.

By way of comparison, the same VSA test is carried out while replacing the MTS of Example 1 with an active charcoal sold by the Applicant Company under the name SA 1831, with a BET specific surface area of 1.320 m²/g and a pore volume of 0.85 cm³/g (measured by $N_2$ adsorption at 77° K. (<100 Å)) and a wide pore size distribution (10–200 Å).

For the two adsorbents tested (the MTS and the active charcoal), the useful working capacity is in the region of 7.5 g of VOC/l of adsorbent, which shows the ability of the adsorbent to operate with as good a performance as an active charcoal without exhibiting the disadvantages due to inflammability.

EXAMPLE 9

Preparation From Precipitated Silica of a Mesoporous Inorganic Solid With a Narrow and Calibrated Distribution of the Mesopores 29.4 g of Noramium MS 50 and 8.4 g of sodium hydroxide are dissolved in 310 g of water. After stirring in order to dissolve all the ingredients, 31 g (anhydrous equivalent) of precipitated silica sold by the Applicant's Company under the name Levilite, with a BET specific surface area of 627 m²/g and with a pore volume of 0.73 cm³/g (measured by $N_2$ adsorption at 77° K. (10–500 Å)), are dispersed in the mixture and then it is brought to a temperature of approximately 100° C., at which temperature the mixture is maintained for 16 hours with gentle stirring. The mixture is filtered and the solid obtained is washed with 6 l of water and then dried, which solid exhibits, after a heat treatment at 550° C. for 2 h under air, the following characteristics:

| | |
|---|---|
| BET specific surface area | 1100 m²/g |
| Pore volume | 0.73 m³/g |
| (measured by $N_2$ adsorption at 77° K (20–100 Å)) | |
| Mean pore diameter (BJH) | 28 Å |

90% of the mesopore volume is between 23 and 33 Å.

The pore distribution curve obtained by BJH utilization of the $N_2$ adsorption/desorption isotherms at 77° K. corresponds to FIG. 1.

EXAMPLE 10

29.4 g of Noramium MS 50 and then 8.4 g of sodium hydroxide are dissolved in 310 g of water. After stirring in order to dissolve all the ingredients, 31 g (anhydrous equivalent) of precipitated silica sold by Grace under the name Silopol 2104, with a BET specific surface area of 322 m²/g and a pore volume of 1.6 cm³/g (measured by $N_2$ adsorption at 77° K. (10–500 Å)), are dispersed in the medium and then it is brought to a temperature of 100° C., at which temperature the mixture is maintained for 16 h with gentle stirring. The mixture is filtered and the solid obtained is washed with 6 l of water and then dried, which solid exhibits, after heat treatment at 550° C. for 2 h under air, the following characteristics:

| | |
|---|---|
| BET specific surface area (m²/g) | 1114 m²/g |
| Pore volume (20–100 Å) | 1.04 cm³/g |
| (measured by $N_2$ adsorption at 77° K (20–100 Å)) | |
| Mean pore diameter (BJH) | 33 Å |

90% of the pore distribution is between 28 and 38 Å.

EXAMPLE 11

The powder obtained in Example 10 is shaped by agglomeration by mixing with a clayey binder and a water-retaining agent, such as carboxymethylcellulose, intended to facilitate the shaping. The paste was subsequently extruded and the content of binder, expressed as the ratio of weight of binder to total weight (binder+MTS), is 20%.

The extrudates thus obtained are crushed, so that their mean length is equal to approximately 4 to 5 mm, and then they are dried and calcined under air at 550° C. for 2 h. The main characteristics of the adsorbents according to the invention are shown below:

| Type of MTS | MTS 35 |
|---|---|
| Pore volume by toluene adsorption (25° C.– P/Ps = 0.5) (cm³/g) | 0.71 |
| BET specific surface area (m²/g) | 900 |
| Pore volume by $N_2$ adsorption at 77° K (20–100 Å) (cm³/g) | 0.85 |
| Mean diameter by $N_2$ adsorption at 77° K (DFT) (Å) | 33 |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/03.831, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An inorganic solid capable of adsorbing more than 7.5% by weight of toluene under a relative pressure of 0.5 at 25° C., which exhibits a mesopore volume of greater than or equal to 0.09 cm³/g, at least 90% of the total pore volume of which has a diameter of greater than 20 Å and at least 90% of the porosity of which is distributed about the mean diameter plus or minus 5 Å, with a mean particle size generally between 1 and 10 mm, and which comprises:

from 50 to 95 parts by weight (calculated as calcined equivalent) of, a porous inorganic solid micelle templated silica (MTS) capable of adsorbing more than 15% by weight of toluene under a relative pressure of 0.5 at 25° C. and which exhibits a mesopore volume of greater than or equal to 0.18 cm³/g, at least 90% of the total pore volume of which has a diameter of greater than 20 Å and at least 90% of the porosity of which is distributed about the mean diameter plus or minus 5 Å, and from 50 to 5 parts by weight of an inert binder that is inert with respect to adsorption.

2. An inorganic solid with a narrow and calibrated mesopore distribution according to claim 1, having a chemical composition of the formula:

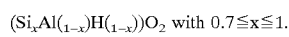

$(Si_xAl_{(1-x)}H_{(1-x)})O_2$ with $0.7 \leq x \leq 1$.

3. A solid according to claim 2, produced by a process comprising crystallizing a reaction mixture comprising a source of silica, an agent for mobilizing the silica, optionally a small amount of aluminium, a surfactant which acts as directing agent, a solvent and optionally a swelling agent which dissolves in the micelles; subjecting the resultant pulverulent inorganic solid to filtration, washing and drying, and calcination; agglomerizing the resultant calcined pulverulent solid in the presence of water and an adsorption-wise inert binder selected from the group consisting of a clay, a silica, titanium oxide and zirconium oxide, and subjecting the resultant agglomerate to calcination at a temperature of at least 400° C.

4. A solid according to claim 3, wherein the agent for mobilizing the silica is sodium hydroxide.

5. A process for producing the solid according to claim 2, comprising crystallizing a reaction mixture comprising a source of silica, an agent for mobilizing the silica, optionally a small amount of aluminium, a surfactant which acts as directing agent, a solvent and optionally a swelling agent which dissolves in the micelles; subjecting the resultant pulverulent inorganic solid to filtration, washing and drying, and calcination; agglomerizing the resultant calcined pulverulent solid in the presence of water and an inert binder that is inert with respect to adsorption selected from the group consisting of a clay, a silica, titanium oxide and zirconium oxide, and subjecting the resultant agglomerate to calcination at a temperature of at least 400° C.

6. A process according to claim 5, wherein the agent for mobilizing the silica is sodium hydroxide.

7. An inorganic solid according to claim 1, capable of adsorbing more than 10% by weight of toluene under a relative pressure of 0.5 at 25° C.

8. A process for the separation of the components of a mixture composed of at least two gaseous molecular compounds comprising the following stages, operating alternately:
   a) passing the gas mixture into an adsorption region comprising an inorganic solid with a narrow and calibrated mesopore distribution as defined in claim 1, and recovering either the compound having the lowest boiling point or a gas mixture enriched in a compound having the lowest boiling point at the outlet of the said adsorption region,
   b) desorbing the compounds adsorbed in the adsorption region, and
   c) regenerating the adsorption region so as to restore its adsorption capacity.

9. A process according to claim 8, wherein the regeneration stage c) is carried out by applying a vacuum, by purging the adsorption region with one or more inert gas(es) and/or with the gas compound obtained at the outlet of the adsorption region, by an increase in temperature or by a combination of vacuum purging and/or an increase in temperature.

10. A process according to claim 8, operating as either a PSA or VSA process, wherein the desorption stage b) is carried out by lowering the partial pressure of compounds adsorbed within the adsorption region, followed by a rise in pressure in the adsorption region by introduction of a stream of the compound with a low boiling point or of the gas mixture enriched in compound with a low boiling point, countercurrentwise or cocurrentwise (stage c)).

11. A process according to claim 8, operating as a TSA process, wherein the desorption stage b) is carried out by increasing the temperature of the adsorption region with respect to the temperature of stage a).

12. A process according to claim 8, operating as a PTSA process, wherein the desorption stage b) is carried out by increasing the temperature of the adsorption region with respect to the temperature of stage a) and by lowering the partial pressure of compounds adsorbed within the adsorption region, followed by a rise in pressure in the adsorption region by introduction of a stream of the compound with a low boiling point or of the gas mixture enriched in compound with a low boiling point, countercurrentwise or cocurrentwise (stage c)).

13. A process according to claim 8, wherein the compound with the lowest boiling point is dry or humid air.

14. A process according to claim 13, wherein the gaseous mixture comprises a compound with a higher boiling point which is a hydrocarbon or an oxygenated hydrocarbon.

15. A process according to claim 8, wherein the compound with the lowest boiling point is a hydrocarbon or an oxygenated hydrocarbon.

* * * * *